United States Patent
Tucker-Peake

(10) Patent No.: US 6,827,663 B2
(45) Date of Patent: Dec. 7, 2004

(54) DIFFERENTIAL GEAR

(75) Inventor: Adrian Tucker-Peake, Bromsgrove (GB)

(73) Assignee: GKN Technology Limited (GB)

( * ) Notice: Subject to any disclaimer, the term of this patent is extended or adjusted under 35 U.S.C. 154(b) by 0 days.

(21) Appl. No.: 10/392,701

(22) Filed: Mar. 20, 2003

(65) Prior Publication Data

US 2003/0199359 A1 Oct. 23, 2003

(30) Foreign Application Priority Data

Mar. 22, 2002 (GB) .............................. 0206788

(51) Int. Cl.$^7$ ............................................ F16H 48/20
(52) U.S. Cl. ................. 475/231; 475/233; 475/235; 475/240; 475/150; 475/153; 475/157; 192/84.6; 192/84.7
(58) Field of Search ................................ 475/231, 233, 475/234, 235, 240, 150, 153, 157; 192/84.6, 84.7

(56) References Cited

U.S. PATENT DOCUMENTS

| | | | | |
|---|---|---|---|---|
| 3,546,968 A | * | 12/1970 | Altmann | 475/240 |
| 3,886,813 A | * | 6/1975 | Baremor | 475/240 |
| 5,102,378 A | * | 4/1992 | Gobert | 475/231 |
| 6,296,590 B1 | * | 10/2001 | Gassmann | 475/231 |
| 6,354,979 B1 | * | 3/2002 | Lohr | 475/240 |
| 6,460,677 B1 | * | 10/2002 | Roscoe | 192/84.7 |

FOREIGN PATENT DOCUMENTS

EP          881406 A2 * 12/1998   ......... F16D/43/284

* cited by examiner

*Primary Examiner*—Roger Pang
*Assistant Examiner*—David D. Le

(57) ABSTRACT

A differential having a driving member; an input member; first and second rotatable output members; differential gearing operable between the input member and the first and second output members, for transmitting rotation from the input member to the first and second output members and providing for differential rotation of the first and second output members relative to one another; an engaging device operable to establish a driving connection between the driving member and the input member; an inhibiting device operable to inhibit relative rotation between the first and second output members; and an actuating device for causing the operation of the engaging device and the inhibiting device.

20 Claims, 2 Drawing Sheets

DIFFERENTIAL GEAR

TECHNICAL FIELD

This invention relates to a differential gear device for use in a motor vehicle. More particularly, it relates to two aspects of the differential gear—the control of input torque to the device and the control of output torque from the device.

BACKGROUND OF THE INVENTION

Differential gear devices, commonly referred to as differentials, are well known devices used in motor vehicle drive lines. A differential gear is designed to distribute torque from an input element to two output elements while permitting the two output elements to rotate at different speeds under certain conditions. The output elements may be connected to two wheels alongside one another at opposite sides of, a vehicle, in which case the wheels are required to rotate at different speeds when the vehicle is cornering. The differential may alternatively be an inter-axle differential in a multiple-wheel-drive system, in which case the wheels on the two axles may be required to rotate at different speeds from one another again, for example, when cornering.

In two-wheel drive vehicles, it may be desirable to have the facility to switch to a four-wheel drive system if the vehicle needs more traction. It is known to provide an auxiliary drive to the second axle of the vehicle, in the form of an electric motor drive, to provide this four-wheel drive system. The engagement of such a drive may be achieved by a controlled clutch which engages the auxiliary drive to the second axle.

It is also known to provide a differential with a means for inhibiting the differential action thereof. The differential action may be inhibited to the extent that it is completely locked, i.e., no relative rotation is possible between its two outputs. This is carried out to overcome problems with uneven traction surfaces such as where a wheel or wheels driven by one of the differential outputs is on a slippery surface and the wheel or wheels driven by the other of the outputs is on a surface which is not slippery. Under these conditions, a differential without any means for inhibiting or locking its differential action directs only a small torque to both wheels, limited by that torque transmitted by the slipping wheel thus potentially immobilizing the vehicle.

On existing systems which incorporate both an auxiliary drive to the second axle and a differential inhibiting means, the method of engaging these two systems would be achieved by two separate clutch systems. This method is very expensive to install, and also the engagement times for the systems are not fast enough to react to emergency situations such as when the driver is no longer in control of the motor vehicle.

SUMMARY OF THE INVENTION

The present invention provides an auxiliary drive allowing a two-wheel drive vehicle to be temporarily converted into a four-wheel drive vehicle, while also inhibiting the differential action of the differential on the auxiliary drive to cope with the aforementioned problems on uneven traction surfaces.

According to one embodiment of the invention, a differential is provided comprising: a driving member; an input member; first and second rotatable output members; differential gearing operable between the input member and the first and second output members, for transmitting rotation from the input member to the first and second output members and providing for differential rotation of the first and second output members relative to one another; an engaging device operable to establish a driving connection between the driving member and the input member; an inhibiting device operable to inhibit relative rotation between the first and second output members; and an actuating device for causing the operation of the engaging device and the inhibiting device.

In another embodiment, the actuating device is adapted to cause sequential operation of the engaging device and the inhibiting device.

In a further embodiment, the engaging device is operated to establish the driving connection between the driving member and the input member prior to the inhibiting device being operated ultimately to lock the first and second rotatable output members so that there is no relative motion therebetween.

The engaging device and the inhibiting device may be contained within the input member. The inhibiting device may be a first clutch mechanism such as a multi-plate clutch pack. The engaging device may be a second clutch mechanism such as a multi-plate clutch pack.

In a further embodiment, the actuating device comprises an electric rotational actuator such as an electric motor, and an actuator member operable on the engaging device.

In order for the engaging device to be operated prior to the inhibiting device, the operation of the inhibiting device by the actuating device may be effected through a first spring, exerting a force which has to be overcome before the inhibiting device is operated. In one example, the engaging device is operated by the exertion of a force thereon by the actuator, which force is reacted against the first spring.

In another embodiment, the force to operate the engaging device is exerted through a second spring. The inhibiting device is operated by the exertion of a force thereon by the engaging device through the first spring and against the input member.

When the operation of the actuator member is partially reversed, the first spring may return the inhibiting device to its original position, thereby allowing the first and second output members to rotate relative to one another.

When the operation of the actuator member is completely reversed to its original position, the second spring may return the engaging device to its original condition, thereby disconnecting the driving connection between the driving member and the input member.

The first spring can have a higher stiffness than the second spring, thereby allowing the engaging device to establish a driving connection between the driving member and the input member with enough force to transmit torque from the driving member to the input member, without engaging the inhibiting device.

To allow smooth and sequential engagement of the engaging device and the inhibiting device, the actuating device may be a ball ramp actuator.

In another aspect of the invention, the drive to the driving member is an electric motor.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

Figure 1:
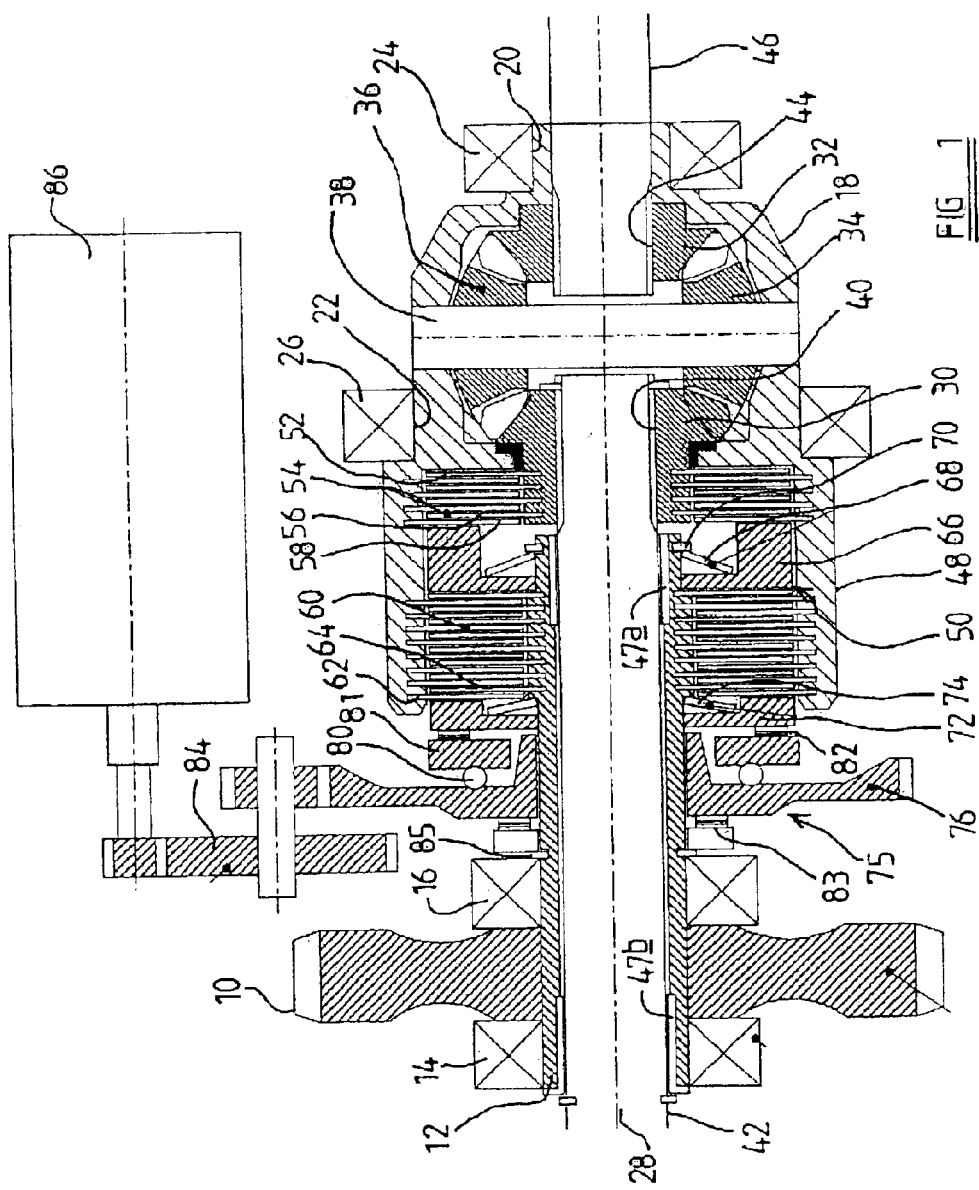
FIG. 1 is a cross-section through a differential in accordance with one embodiment of the invention.

Referring to FIG. 1 there is shown a differential comprising a torque input member in the form of a spur gear 10 connected to a sleeve 12. The spur gear 10 and the sleeve 12 are supported in a housing (not shown) by bearings 14, 16 disposed either side of the spur gear 10 and fixed to the sleeve 12. The bearings 14, 16 provide for the rotation of the spur gear 10 and the sleeve 12 about an axis 28.

An input member in the form of a differential carrier 18 is arranged in line with the spur gear 10 and the sleeve 12 and supported, for rotation about the axis 28, in the housing by bearings 24, 26 respectively on a spigot 20 at one end of the carrier 18 and a bearing seating 22 on the outside of the carrier 18.

Two bevel side gears 30, 32 are supported in the carrier 18 for relative rotation therewithin, and mesh with bevel differential gears 34, 36 rotatably carried by a transverse pin or shaft 38 held in the carrier 18. The interior of the side gear 30 is splined at 40 for torque-transmitting connection with a first output member in the form of an output shaft 42. Likewise, the side gear 32 is also splined at 44, for torque-transmitting connection with a second output member in the form of an output shaft 46. The output shaft 42 extends through the sleeve 12 and is supported within the sleeve 12 by bushes 47a, 47b. The output shaft 46 extends through the spigot 20 of the carrier 18.

Within a portion 48 of the carrier 18 there is an annular chamber indicated generally at 50, with an axially facing annular end wall 52. Adjacent to the wall 52 is an inhibiting device in the form of a clutch pack 54. The clutch pack 54 comprises a plurality of annular plates 56 rotationally fast with the side gear 30 and a plurality of annular plates 58 respectively interposed between adjacent plates 56 and rotationally fast with the carrier 18. The plates 54, 56 are axially moveable and are able to be urged together into frictional engagement with one another. Other mechanisms for rotationally locking the carrier 18 and side gear 30 are also contemplated for the inhibiting member.

Adjacent to the clutch pack 54 is an engaging device in the form of a further clutch pack 60 with a plurality of annular plates 62 rotationally fast with the sleeve 12 and a plurality of annular plates 64 respectively interposed between the plates 62 and rotationally fast with the carrier 18, these plates being frictionally engageable with one another. Other apparatus for rotationally locking the carrier 18 and the sleeve 12 are also contemplated for the engaging mechanism.

Inbetween the dutch packs 54 and 60 is an annular engaging member 66. which is urged away from the wall 52 by a spring 68 in the form of a Beileville spring. The spring 68 reacts against circlip 70 contained within a circumferential recess on the sleeve 12. Adjacent to the outermost end of the clutch pack 60 is a further annular engaging member 72, which reacts against a second spring 74, whose inner diameter abuts a shoulder on the sleeve 12. The spring 74 is also shown as a Belleville spring. The second spring 74 has a lower stiffness than the first spring 68.

Figure 2:
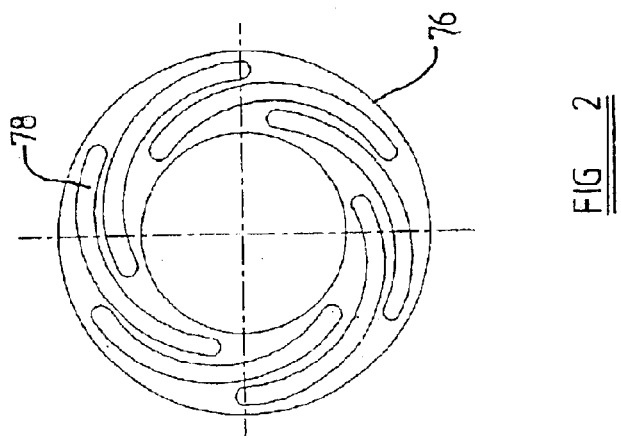
FIG. 2 is an end face view of the actuator member in accordance with one embodiment of the invention.

Neighboring the bearing 16 is a thrust bearing 83, which abuts a circlip 85 engaging a recess on the sleeve 12 between the bearing 16 and the bearing 83. Axially facing, and in contact with, the bearing 83 is an actuator member in the form of a ball ramp actuator 75. The actuator 75 comprises an annular disc 76, an axial view of which is shown in FIG. 2, and six balls 80. The disc 76 has six recesses 78, which are curvilinear and spiral outwardly from the center of the disc 76. The depth of each recess 78 decreases as it spirals away from the center of the disc.

Adjacent to the disc 76 is a further disc 81 with spiral recesses which face the recesses 78 and spiral in the opposite direction thereto. The recesses 78 have a cross-section conforming to the cross-section of the balls 80. Each ball 80 is held in a facing pair of recesses 78 in the disc 76 and the disc 81. Abutting the disc 81 is a further thrust bearing 82 which also abuts the engaging member 72. Disc 81 is held against rotational movement by any one of several known mechanisms.

The disc 76 has a toothed profile around its circumference, which provides for rotational connection of the disc 76 to an electric actuator motor 86, through reduction gears 84.

When the disc 76 is rotated by the motor 86, the balls 80 move generally radially outwardly along their respective facing pairs of recesses 78. As the recesses 78 decrease in depth, the disc 81 is displaced axially in the direction of the axis 28 towards the carrier 18. The thrust bearings 82, 83 allow for the carrier 18 and the sleeve 12 to rotate about the axis 28 whilst the actuator member 75 is stationary.

Although the actuator assembly 75 has been shown as a ball-ramp actuator, other mechanisms could also be used to provide axial thrust in response to rotational movement. For example, a cammed disc arrangement or cam-follower arrangement could alternatively be used.

Figure 3:
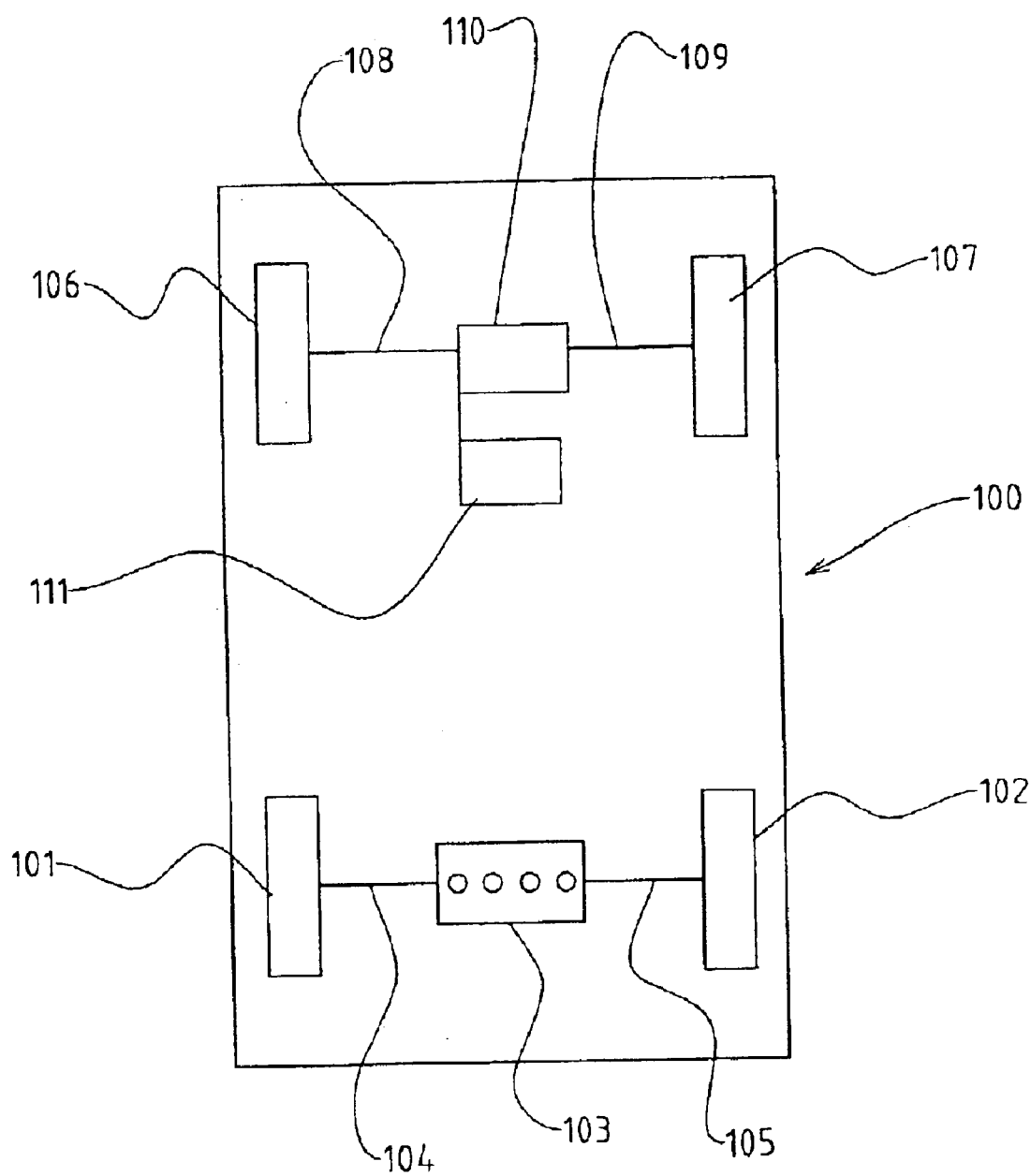
FIG. 3 is a schematic view of a vehicle including a differential in accordance with one embodiment of the present invention.

Referring to FIG. 3 of the drawings, there is schematically shown an embodiment of the invention applied to a two-wheel drive vehicle as an electrical four-wheel drive add-on or "hang-on" system. The vehicle is diagrammatically indicated at 100, and has front wheels 101, 102 driven from an engine/gearbox unit 103 by half shafts 104, 105. It has rear wheels 106, 107 connected by respective half shafts 108, 109 to the output shafts 42 and 46 of the differential in accordance with the invention, indicated at 110. The spur gear 10 of the differential 110 is connected through appropriate gearing to an electric drive motor 111, which thus applies torque to the sleeve 12.

In conditions where two-wheel drive of the front wheels 101, 102 does not give sufficient traction, it may be desirable to drive the rear wheels 106, 107 of the vehicle, by the electric motor 111. This is carried out by engaging the clutch pack 60, to drivingly connect the sleeve 12 and the differential carrier 18. This engagement is carried out by the motor 86 rotating the annular disc 76 about the axis 28, so that the balls 80 move generally radially outwardly along their respective pair of facing recesses 78, which produces an axial displacement of the disc 81. The disc 81 axially displaces the engaging member 72, against the action of the relatively light Belleville return spring 74, into contact with the outermost annular plate 62 or 64. This causes the annular plates 62, 64 to frictionally engage with one another, as the plate 62 or 64 closest to the engaging member 66 is restricted from moving axially by the engaging member 66 and the relatively heavy Belleville return spring 68. As the plates 62, 64 frictionally engage they progressively inhibit the relative rotation of the carrier 18 and the sleeve 12 until there is no relative rotation between the carrier 18 and the sleeve 12. Hence, this engagement of the clutch pack 60 provides a rotationally fast connection between the sleeve 12 and the carrier 18, thereby providing for driving both output shafts 42 and 46 by the electric motor 86, connected to spur gear 10, while also providing for differential rotation between the two shafts 42, 46.

However, if the rear wheels of the vehicle are on uneven traction surfaces relative to one another (i.e. if one wheel has more grip than the other wheel), it may be useful to inhibit the differential action so that a higher torque is applied through one output shaft 42 or 46 directing towards the wheel having the most grip. By rotating the disc 76 further in the same direction as the previous step, the disc 76 causes the balls 80 to rotate further around their respective pair of facing recesses 78, which further axially displaces the disc 81 along the axis 28. This further displacement of the disc 81 overcomes the reaction of the heavy Belleville return spring 68 and hence causes the annular plates 54, 56 to frictionally engage with one another as the plate 54 or 56 closest to the wall 52 is restricted from moving axially by the wall 52.

As the plates 54, 56 frictionally engage they progressively inhibit relative rotation between the carrier 18 and side bevel gear 30 until the carrier 18, side gear 30 and the side gear 32 rotate together. Therefore the engagement of the clutch pack 54 provides, eventually, depending on the relative grip of the left and right wheel with the road, a rotationally fast connection between the sleeve 12 and the bevel gear 30, thereby redistributing the torque so that a high torque is applied to the wheel on the gripping surface.

Once both the wheels are on even traction surfaces relative to one another, the actuator motor 86 can be reversed slightly, thereby allowing the spring 68 to move the disc 81 in the opposite direction to its original position and hence disengage the clutch pack 54. This will allow for differential rotation of the output shafts 42, 46. If it is also decided that four-wheel drive is not needed, the actuator motor 86 can be reversed further still, thereby allowing the spring 74 to move the disc 81 back to its original position and hence disengage the clutch pack 60, thereby disengaging the driving connection between the sleeve 12 and the carrier 18.

While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A differential comprising:
    a driving member for providing a torque input to the differential;
    first and second rotatable output members;
    an input member for transmitting torque from the driving member to the first and second rotatable output members;
    differential gearing operable between the input member and the first and second output members, for transmitting torque from the input member to the first and second output members while providing for differential rotation of the first and second output members relative to one another;
    an engaging device operable to establish a driving connection between the driving member and the input member;
    an inhibiting device operable to inhibit relative rotation between the first and second output members; and
    an actuating device for causing the operation of the engaging device and the inhibiting device.

2. A differential according to claim 1 wherein the engaging device and the inhibiting device are contained within the input member.

3. A differential according to claim 1 wherein the actuating device is a ball-ramp actuator.

4. A differential according to claim 1 wherein the actuating device is adapted to cause sequential operation of the engaging device and the inhibiting device.

5. A differential according to claim 4 wherein the engaging device is operated to establish the driving connection between the driving member and the input member prior to the inhibiting device being operated.

6. A differential according to claim 4 wherein the operation of the inhibiting device by the actuating device is effected through a first spring.

7. A differential according to claim 6 wherein the engaging device is operated by the exertion of a force thereon by the actuating device, which force is reacted against the first spring.

8. A differential according to claim 7 wherein the force to operate the engaging device is exerted through a second spring.

9. A differential according to claim 8 wherein the second spring returns the engaging device to its original condition.

10. A differential according to claim 7 wherein the inhibiting device is operated by the exertion of a force thereon by the engaging device through the first spring and against the input member.

11. A differential according to claim 10 wherein the first spring returns the inhibiting device to its original position.

12. A differential according to claim 1 wherein the inhibiting device is a first dutch.

13. A differential according to claim 12 wherein the first clutch is a multi-plate clutch pack.

14. A differential according to claim 12 wherein the engaging device is a second clutch.

15. A differential according to claim 14 wherein the second clutch is a multi-plate dutch pack.

16. A differential according to claim 1 wherein the actuating device is electrically operated.

17. A differential according to claim 16 wherein the actuating device comprises:
    an electric rotational actuator; and
    an actuator member operable on the engaging device.

18. A differential comprising;
    a driving member for providing a torque input to the differential;
    first and second rotatable output members;
    an input member for transmitting torque from the driving member to the first and second rotatable output members;
    differential gearing operable between the input member and the first and second output members, for transmitting torque from the input member to the first and second output members and providing for differential rotation of the first and second output members relative to one another;
    an engaging device operable to establish a driving connection between the driving member and the input member;

an inhibiting device operable to inhibit relative rotation between the first and second output members;

an actuating device for causing sequential operation of the engaging device and the inhibiting device;

a first spring through which force to operate the inhibiting device is exerted; and a second spring through which force to operate the engaging device is exerted by the actuating device, which force is reacted against the first sprint, and wherein the second spring has a lower stiffness than the first spring.

19. A motor vehicle including:

a first pair of wheels and a main drive system for driving the first pair of wheels;

a second pair of wheels and an auxiliary drive system for driving the second pair of wheels, the auxiliary drive system including an electric motor and a differential, the differential comprising:

a driving member;

an input member, drivable by the motor by way of the driving member;

first and second rotatable output members for connection to respective wheels of the second pair of wheels of the vehicle;

differential gearing operable between the input member and the first and second output members, for transmitting rotation from the input member to the first and second output members and providing for differential rotation of the first and second output members relative to one another;

an engaging device operable to establish a driving connection between the driving member and the input member;

an inhibiting device operable to inhibit relative rotation between the first and second output members; and an actuating device for causing sequential operation of the engaging device and the inhibiting device.

20. An auxiliary "hang-on" drive system for wheels of a motor vehicle, the system including a motor and a differential, the differential comprising:

a driving member;

an input member, drivable by the motor by way of the driving member;

first and second rotatable output members for connection to respective wheels of the vehicle;

differential gearing operable between the input member and the first and second output members, for transmitting rotation from the input member to the first and second output members and providing for differential rotation of the first and second output members relative to one another;

an engaging device operable to establish a driving connection between the driving member and the input member;

an inhibiting device operable to inhibit relative rotation between the first and second output members; and an actuating device for causing sequential operation of the engaging device and the inhibiting device.

* * * * *